C. CHRISTIANSEN.
FENDER BRACE.
APPLICATION FILED SEPT. 25, 1916.
1,240,942.
Patented Sept. 25, 1917.
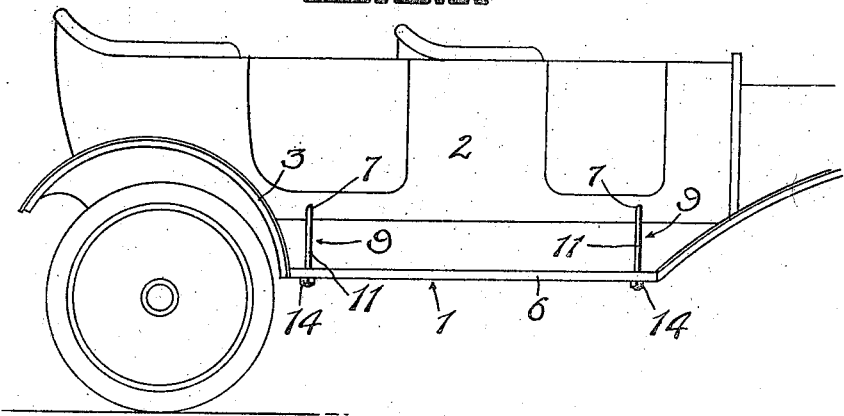
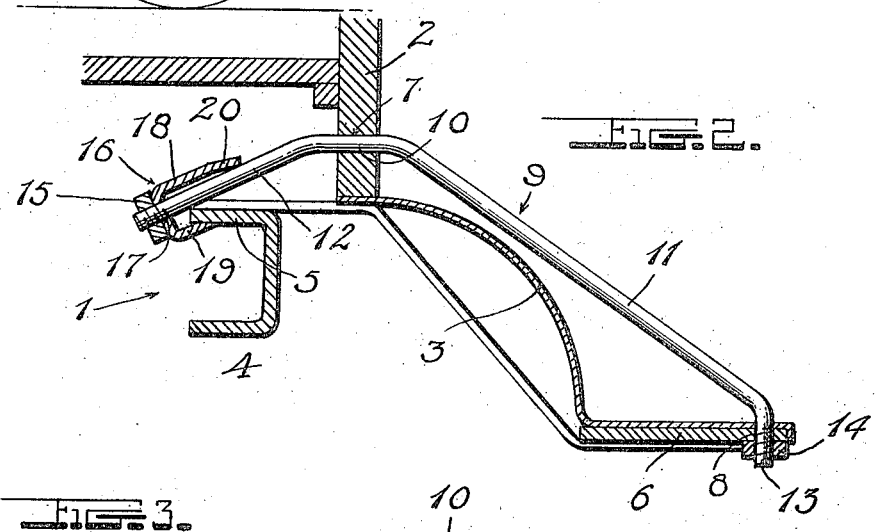
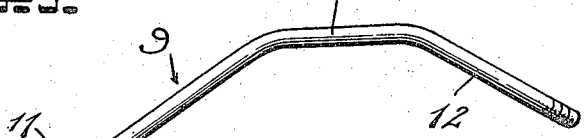
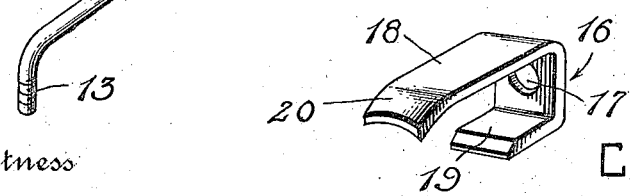
Witness
Edwin B. Hunt
Inventor
C. Christiansen
by H.B. Willson &Co.
Attorneys

UNITED STATES PATENT OFFICE.

CHRISTIAN CHRISTIANSEN, OF SIOUX FALLS, SOUTH DAKOTA.

FENDER-BRACE.

1,240,942.  Specification of Letters Patent.  Patented Sept. 25, 1917.

Application filed September 25, 1916.  Serial No. 122,049.

*To all whom it may concern:*

Be it known that I, CHRISTIAN CHRISTIANSEN, a citizen of the United States, residing at Sioux Falls, in the county of Minnehaha and State of South Dakota, have invented certain new and useful Improvements in Fender-Braces; and I do declare the following to be a full, clear, and exact description of the invention, such as will enable others skilled in the art to which it appertains to make and use the same.

This invention relates broadly to improvements in automobiles and similar vehicles, and more particularly to braces therefor.

The object of the invention is to provide a brace whereby the fenders of a vehicle may be supported, the brace being so constructed that it may be adjusted from time to time to take up wear on the parts. It is well known that the fenders of automobiles, particularly the running board portion, is prone to sag. My invention is designed to overcome this and at the same time supply a device which will more securely hold the body of the vehicle to the chassis bars thereof.

With this general object in view, the invention resides in the novel features of construction and the combination of parts which will be hereinafter more particularly described and claimed.

In the accompanying drawing:

Figure 1 represents a side elevation of a portion of an automobile showing the application of my improved fender brace;

Fig. 2 is a transverse sectional view through a portion of a motor vehicle showing a brace constructed in accordance with my invention applied thereto; and Fig. 3 is a detail perspective view of the brace detached.

Fig. 4 is an enlarged detail perspective view of the clip 16.

Referring more particularly to the drawing wherein similar reference characters indicate like parts in the several views, the numeral 1 denotes the chassis of an automobile upon which a body 2 is disposed, fenders 3 being secured to the opposite sides of said body in the usual manner. The chassis frame is composed of channeled side bars 4, the upper horizontal flanges 5 of which are disposed inwardly toward each other. The body is attached to the chassis frame in the usual or any preferred manner. My improved brace which will be more particularly described later is designed primarily for supporting the running board portion of the fender 3, this portion being designated by the numeral 6. The portions of the fenders over the wheels are not so liable to sag as the other parts since the latter portions have to support the weight of persons getting into and out of the vehicle. In applying one of my improved braces to an automobile, a horizontal opening 7 is first formed in one side of the body adjacent the point where the brace is to be attached, a similar opening 8 being also formed vertically through the running board 6, these openings being preferably disposed in a plane at right angles to the longitudinal axis of the vehicle. The brace bar 9 is then applied, said brace bar having a substantially straight portion 10 intermediate its ends which is disposed in the horizontal opening 7. The portions of the bar on each side of said portion 10 are inclined downwardly as shown at 11 and 12, the part 11 being disposed in engagement with the running board 6. The extreme end of the portion 11 is again bent downwardly, this time until it is disposed vertically, whereupon it is extended through the opening 8 in said running board, this vertical portion being numbered 13 in the drawing. This end 13 is threaded and has a nut 14 disposed thereon, said nut clamping the running board 6 between it and the angle formed at the junction of the portion 11 and the end 13.

The portion 12 of the bar which is disposed on the other side of the straight horizontal part 10 is extended downwardly and inwardly until it engages the inner edge of the horizontal flange 5 of the side bar 4. This end is also threaded and provided with a nut 15. By affixing the end 12 to the side bar 4 it will be seen that the running board is very effectively braced and held against downward movement.

In order to securely attach the end of the portion 12 to the flange 5, I provide a substantially U-shaped clip 16 having an opening 17 in its base for the reception of the threaded end of the portion 12. One arm 18 of the clip is longer than the other arm 19 and its free end is curved slightly as shown at 20 for engagement with the adjacent portion of the brace bar. The other or shorter arm 19 contacts with the bottom of the flange 5 as clearly shown in Fig. 2. The clip 16 is of course placed on the end of the brace bar before applying the nut 15, and after the latter has been tightly engaged with the base of the clip, the rod will be securely held to the side bar 4 since the flange 5 is held between the arm 19 and the portion 12 of the bar. It will be seen that by tightening up on the nut 15, the brace bar will be drawn inwardly, thus raising the running board 6.

This arrangement effectively prevents sagging of the running board and other parts of the fender, and after the vehicle is used a considerable length of time the nut may be again tightened to compensate for loosening of the parts. In addition to supporting the fender, the brace bar will also aid in holding the body of the vehicle to its frame; this is accomplished by extending the straight horizontal portion of the bar through an opening formed in the side of the body.

I claim:

The combination with a motor vehicle comprising a frame having angle iron side bars, the horizontal flanges thereof extending inwardly, a body on said frame, and fenders on the opposite sides of said body; of a brace rod having a substantially straight intermediate portion disposed horizontally through one side of said body, the end portions on each side of said horizontal part being bent downwardly, one into engagement with the horizontal flange of one side bar, and the other into contact with the horizontal portion of one fender, the last mentioned end being again bent downwardly, thereby disposing the same vertically, and then extended through an opening in said fender, said vertical portion being threaded, a nut on the threaded end, the other end of said rod being also threaded, a U-shaped clip having an opening in its base to receive said last mentioned end, one arm of said clip being longer than the other, the short arm engaging the under side of the horizontal flange of the side bar, the long arm contacting with the rod, and a nut on said threaded end in engagement with the base of said clip.

In testimony whereof I have hereunto set my hand in the presence of two subscribing witnesses.

CHRISTIAN CHRISTIANSEN.

Witnesses:
HAROLD G. LEDYARD,
GRACE WALKER.

Copies of this patent may be obtained for five cents each, by addressing the "Commissioner of Patents. Washington, D. C."